Oct. 18, 1960  R. L. WRIGHT, JR  2,957,126
NON-ELECTRONIC ECCENTRICITY DETECTOR
Filed May 16, 1958
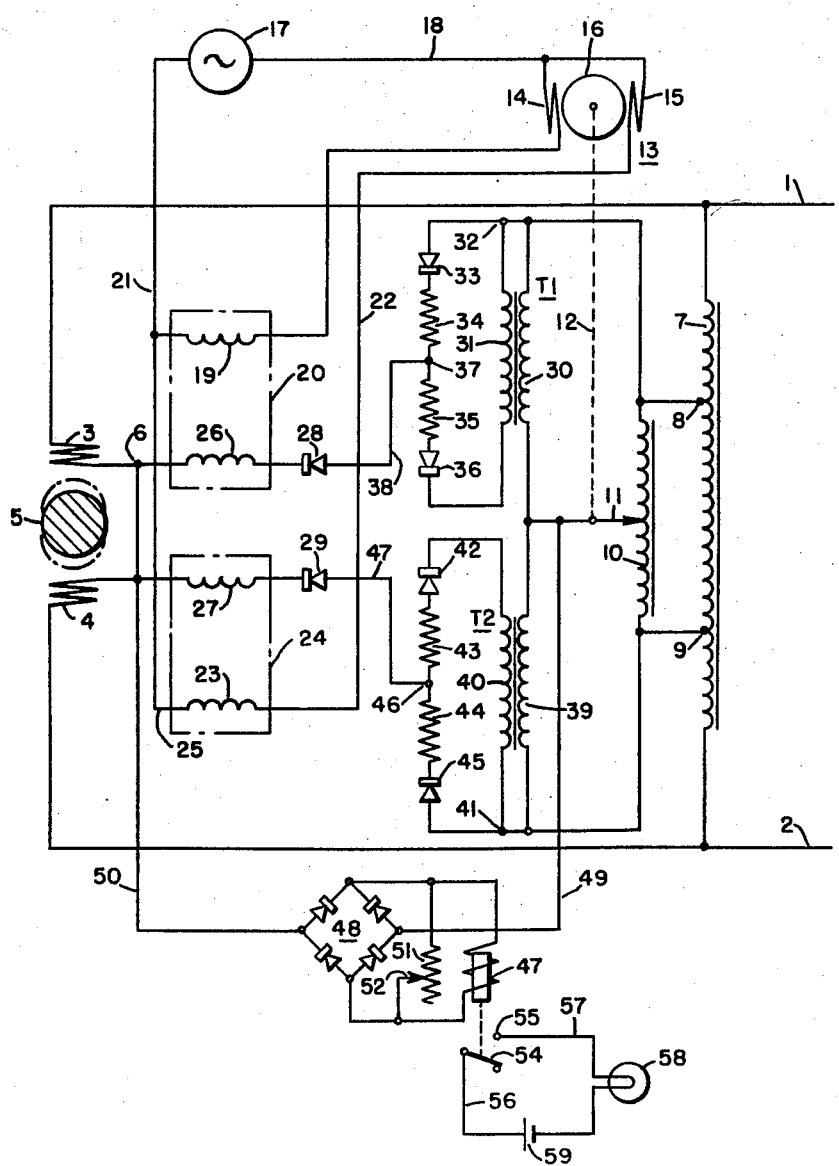
WITNESSES
Leon J. Faza
James F. Young
INVENTOR
Robert L. Wright, Jr.
BY
George C. Thompson Jr.
ATTORNEY United States Patent Office 2,957,126
Patented Oct. 18, 1960

2,957,126

NON-ELECTRONIC ECCENTRICITY DETECTOR

Robert L. Wright, Jr., North Linthicum, Md., assignor to Westinghouse Electric Corporation, East Pittsburgh, Pa., a corporation of Pennsylvania Filed May 16, 1958, Ser. No. 735,781

6 Claims. (Cl. 324—34)

This invention relates to a non-electronic eccentricity device, and more particularly, to an eccentricity device for a rotating machine capable of determining the amount of eccentricity of the rotating member in the machine without the use of electron devices.

In machines such as steam turbines it is necessary to detect the amount of eccentricity occurring in the shaft of the stream turbine during the initial rotating periods of the turbine shaft and blades. This eccentricity occurs in response to higher temperature steam being exposed to one-half of the shaft and blades than the steam associated with the other half of the shaft and blades. The result is a bending of the shaft to the extreme capable of causing damage to the turbine blades if the rotation is increased. Other devices utilized for determining the amount of eccentricity in steam turbines have either involved mechanical devices which are subject to wear and somewhat cumbersome or electronic circuits depending upon vacuum tube devices for their operation. Since mechanical devices are subject to wear and electronic tubes are subject to rapid deterioration and failure, a more reliable device for the purpose is needed.

It is therefore an object of this invention to provide a turbine eccentricity device capable of rapid reliable operation without the danger of failure.

It is another object of this invention to provide a turbine eccentricity device free from electronic devices and more reliable in operation.

It is another object of this invention to provide a turbine eccentricity device capable of indicating eccentricity over and above a desirable maximum eccentricity limit while allowing unharmful eccentricity to occur without indication.

Other objects, purposes and characteristic features will become obvious as a description of the invention progresses.

In practicing this invention, there is a turbine eccentricity device utilizing pickup coils adjacent an eccentric shaft for the purpose of detecting any eccentricity in the shaft. The shaft eccentricity detected by the pickup coils is then utilized to control magnetic amplifiers for the purpose of driving a motor controlled potentiometer or movable tap transformer capable of indicating the average shaft position during eccentricity. The instantaneous value on each of the pickup coils is then compared to the average value indicated by the movable tap transformer to determine the amount of eccentricity occurring in the rotating shaft. A detector circuit is then used to compare the two voltages.

The figure of the drawing is a schematic view of one embodiment of this invention utilizing a comparison of instantaneous shaft position to average shaft position for detection purposes.

In the view of the drawing, similar parts bear like reference characters.

In the figure of the drawing, a pair of conductors 1 and 2 connected to a supply of alternating current, not shown, but preferably of approximately 240 volt, 60 cycle frequency, have connected thereacross a pair of series connected coils 3 and 4. The coils 3 and 4 are placed adjacent to a rotating shaft 5 in positions 180° apart. It can be seen therefore that assuming the shaft 5 is eccentric its approach toward and away from each of the coils 3 and 4 causes a change in impedance within the coils 3 and 4 resulting in a point such as a point 6 varying above and below a mid-point voltage half-way between the supply voltage applied to the conductors 1 and 2.

Also connected across the conductors 1 and 2 is an autotransformer 7 provided with tie points 8 and 9 positioned approximately 60 volts apart and equidistant voltage from the conductors 1 and 2. Connected between the tie points 8 and 9 is a potentiometer or movable tap transformer 10 provided with a movable tap (or brush) 11 connected by a mechanical linkage 12 to a reversible motor 13.

The motor 13 is provided with a pair of fields 14 and 15 connected to cause the armature 16 of the motor 13 to rotate in opposite directions depending upon which one of the field windings is energized. Movement of the brush 11 by the armature 16 of the motor 13 is very slow and therefore can be driven by a very low power motor. Thus, the use of a permanent magnet armature alternating current type of motor can be utilized. The operation of the motor to drive the brush 11 is one allowing the brush 11 to move from one extreme position to the other over a period of, say, ten minutes.

The energizing circuit for the field windings of the motor 13 can be traced from a suitable source of supply such as the alternating current source 17 through the conductor 18 to one terminal each of the field windings 14 and 15. The remaining terminal of the field winding 14 is then connected through the main winding 19 of a suitable magnetic amplifier 20 to the conductor 21 returning to the opposite side of the source 17. The field winding 15 is also connected to the conductor 18 and through the conductor 22 to the main winding 23 of the magnetic amplifier 24 which is connected through the conductor 25 to the conductor 21 and source 17. The supply source 17 is preferably a low voltage supply, such as for example, a 27 volt supply capable of providing adequate field excitation for the motor 13.

The magnetic amplifiers 20 and 24 are provided with control windings 26 and 27, respectively. Each of the control windings are provided with one terminal connected to the common point 6 located between the coils 3 and 4 associated with the shaft 5. The control windings 26 and 27 are connected through oppositely poled rectifiers 28 and 29, respectively, to the secondary circuits of the transformers T1 and T2, respectively.

The transformer T1 has a primary winding 30 connected between the movable tap (or brush) transformer 11 and the junction point 8 commonly connected to one terminal of the movable brush transformer 10. The transformer T1 is provided with a secondary winding 31 having a sufficient number of turns to provide a 2:1 step-up operation within the transformer T1. One terminal 32 of the transformer secondary 31 is connected to a common terminal of the primary 30 and movable tap transformer 10 terminal, each of which is connected to the common point 8 on the transfermer 7 providing a reference point in the control system. The secondary 31 is provided with a secondary circuit including a rectifier 33, two resistors 34, 35 and a rectifier 36 connected in sequence series across the output of the secondary 31. The two rectifiers 33 and 36 are like poled to allow current flow in one direction through the secondary circuit in response to the output of the secondary. The midpoint 37 between the resistors 34 and 35 is then connected through a conductor 38 and the rectifier 28 to the control winding 26 of the magnetic amplifier 20.

The transformer T2 is identical with the transformer T1 and is also provided with a primary 39 connected between the brush 11 and the common point 9 on the autotransformer 7 that is also connected to the other end of the movable brush transformer 10. The transformer T2 is provided with a secondary 40 having one end 41 connected also to the common point 9 on the autotransformer 7 along with the primary winding 39 of the transformer T2. The secondary winding 40 is also provided with sufficient number of turns to provide a 2:1 step-up within the transformer T2. Connected across the secondary winding 40 is a series output circuit including a rectifier 42, a resistor 43, another resistor 44 and still another rectifier 45. The rectifiers 42 and 45 are poled in a like manner to allow current flow on one-half cycle through the secondary of the transformer T2. The common point 46 between the resistors 43 and 44 is then connected through the conductor 47 and the rectifier 29 to the control winding 27 of the magnetic amplifier 24.

The purpose of the step-up operation of the transformers T1 and T2 and the secondary series arrangement of each of the transformers T1 and T2 is to provide a potential difference between the points 37 and 46 even though the brush 11 happens to be in a voltage position half-way between the points 8 and 9 of the autotransformer 7. With the control windings 26 and 27 of the magnetic amplifiers 20 and 24 connected to a common point 6 between the pickup conductors 3 and 4 and to the points 37 and 46, respectively, of the transformer secondary circuits, a potential difference exists between the point 6 and the points 37 and 46 at all times keeping the magnetic amplifiers under a constant potential providing immediate magnetic amplifier control without dead-zone possibilities.

It can be seen therefore that during eccentric conditions of the shaft 5, the voltage of the point 6 will vary above and below a mid-voltage between the conductors 1 and 2 by the amount of reactance existing in the pickup coils 3 and 4 between maximum and minimum impedance conditions. As this voltage at the point 6 moves up and down, one or the other of the magnetic amplifiers 20 and 24 becomes active to control the motor 13 to drive in one direction or the other depending upon the rise and fall of the potential at the point 6. If we assume that the position of the shaft 5 is one approaching the pickup coil 3, we can see that the reactance of the pickup coil 3 would increase causing a greater drop in voltage between the conductor 1 and the point 6. This means that the point 6 will then fall below the mid-point voltage between the conductors 1 and 2 and cause a greater current flow through the control winding 26 from the brush 11 and transformer T1. This action in turn causes the magnetic amplifier 20 to drive its main winding to allow conduction or flow of current through the field winding 14 which in turn dictates a rotation of the armature of the motor 13 to cause the link 12 to drive the brush 11 slowly downward to more closely approach the instantaneous value established by the eccentricity of the shaft 5 as it approaches the pickup coil 3. As the shaft rotates on around and approaches the coil 4 causing an increase in reactance in the coil 4, it can be seen that the voltage at the point 6 then begins to rise and as it approaches the brush 11 position, cuts off the magnetic amplifier 20 and as the voltage passes the brush 11 causes the magnetic amplifier 24 to become active through current flow through the control winding 27, it having been pointed out that the control winding 27 is connected through the transformer T2 to the brush 11 in a manner similar to the control winding 26 previously stated above. The action of the magnetic amplifier 24 is thus in a direction to cause the field winding 15 to become active through the main winding 23 of the magnetic amplifier 24. With the field winding 15 active, the motor reverses its rotation and begins to drive the brush in the opposite direction to cause the brush 11 to attempt to approach the instantaneous value established at the point 6 by the approach of the shaft 5 to the pickup coil 4.

Since the movement of the brush 11 in either direction is one of an extremely slow rate, it can be seen that the brush 11 begins to move in one direction and before much movement takes place the motor 13 is reversed and the brush begins to move in the opposite direction. The brush 11 then basically seeks an average voltage position between the two extreme eccentric positions of the shaft 5 and thus presents a reference point that is capable of changing in value as necessary. A movable reference point is necessary in the eccentricity detection since it is possible for the shaft 5 to actually reposition itself within its bearing, not shown, due to a climbing action as the shaft speed increases. Although this climbing action and average position of the shaft 5 may be of a small displacement involving a few thousandths of an inch, a fixed reference point may give sufficient detector voltage to be explained hereinafter to cause eccentricity indications when eccentricity does not actually exist.

In order to determine the amount of eccentricity of the shaft 5, a direct current detector relay 47 has its winding connected between the brush 11 and the point 6 through a rectifier 48 and the conductors 49 and 50, respectively.

The relay 47 is a very rapid response relay capable of picking up its contacts in response to just one cycle of a frequency, for eaxmple, of 100 cycles. The relay is also operable on a very small current and is therefore provided with a parallel bias resistor 51 having a variable tap 52 for adjusting the current pickup value of the relay 47.

Operation of the device will now be described further for explaining the detector operation. During the conditions previously recited of the voltage at point 6 rising and falling above and below the average voltage established by the brush 11, it can be seen that the full wave rectifier 48 will provide an average output voltage across the winding of the relay 47, the magnitude of which is determined by the amount of eccentricity existing in the shaft 5. As the eccentricity decreases and the deviation of the point 6 above and below the average point established by the brush 11 decreases, it can be seen that the potential applied to the relay 47 would also decrease. At some desirable point the potential applied to the relay 47 would fall below the pickup value of the relay established by the parallel bias resistor 51.

During relay energization periods, its movable contact is displaced upward, as viewed in the drawing, until the movable contact 54 is against the fixed contact 55. The movable contact is also connected to a conductor 56 and with the fixed contact 55 connected to the conductor 57 an output circuit is established to provide a warning signal 58 with a completed circuit through the battery or other supply of current 59 causing the warning signal to display a warning that a dangerous amount of eccentricity is occurring in the shaft 5.

As the eccentricity reduces and the voltage at the point 6 reduces in its variation about the brush 11 voltage, the relay 47 becomes deenergized and its movable contact 54 moves to its opposite deenergized position interrupting the warning signal circuit and extinguishing the warning indicator 58.

It is to be understood that any suitable warning signal can be used, such as for example, the light 58 shown in the present application.

Since numerous changes may be made in the above described construction without departing from the spirit and scope thereof, it is intended that all matter contained in the foregoing description or shown in the accompanying drawing, shall be interpreted as illustrative and not in a limiting sense.

I claim as my invention:

1. An eccentricity detecting circuit for a rotating member, comprising: a plurality of variable impedance members positioned adjacent said rotating member to be affected by the eccentricity of said rotating member, an energized impedance device having a movable tap, motor means for reversibly driving said movable tap at a slow rate compared to said rotating member eccentricity rate, magnetic amplifier means connected to respond to impedance change in said plurality of impedance members, said magnetic amplifier means being connected to said motor means to selectively drive said motor means in one direction or the other in response to rotating member eccentricity, and detector means connected between said movable tap and said impedance members to compare the instantaneous value of the impedance members with the movable tap of said impedance device.

2. An eccentricity detecting circuit for a rotating member, comprising: a plurality of variable impedance members positioned adjacent said rotating member to be affected by the eccentricity of said rotating member, an energized impedance device having a movable tap, motor means for reversibly driving said movable tap at a slow rate compared to said rotating member eccentricity rate, magnetic amplifier means connected to respond to impedance change in said plurality of impedance members, said magnetic amplifier means being connected to said motor means to selectively drive said motor means in one direction or the other in response to rotating member eccentricity and detector means connected between said movable tap and said impedance members to compare the instantaneous value of the impedance members with the movable tap of said impedance device, said detector means being a relay.

3. An eccentricity detecting circuit for a rotating member, comprising: a plurality of variable impedance members positioned adjacent said rotating member to be affected by the eccentricity of said rotating member, an energized impedance device having a movable tap, motor means for reversibly driving said movable tap at a slow rate compared to said rotating member eccentricity rate, magnetic amplifier means connected to respond to impedance change in said plurality of impedance members, said magnetic amplifier means being connected to said motor means to selectively drive said motor means in one direction or the other in response to rotating member eccentricity, and detector means connected between said movable tap and said impedance members to compare the instantaneous value of the impedance members with the movable tap of said impedance device, said detector means being a relay, and bias means for said relay to establish the energy level of response.

4. An eccentricity detecting circuit for a rotating member, comprising: a plurality of variable impedance members positioned adjacent said rotating member to be affected by the eccentricity of said rotating member, an energized impedance device having a movable tap, motor means for reversibly driving said movable tap at a slow rate compared to said rotating member eccentricity rate, magnetic amplifier means connected to respond to impedance change in said plurality of impedance members, said magnetic amplifier means being connected to said motor means to selectively drive said motor means in one direction or the other in response to rotating member eccentricity, detector means connected between said movable tap and said impedance members to compare the instantaneous value of the impedance members with the movable tap of said impedance device, and voltage control means connected between said movable tap and said magnetic amplifiers for constantly maintaining a bias voltage on said magnetic amplifiers.

5. An eccentricity detecting circuit for a rotating member, comprising: a plurality of variable impedance members positioned adjacent said rotating member to be affected by the eccentricity of said rotating member, an energized impedance device having a movable tap, motor means for reversibly driving said movable tap at a slow rate compared to said rotating member eccentricity rate, magnetic amplifier means connected to respond to impedance change in said plurality of impedance members, said magnetic amplifier means being connected to said motor means to selectively drive said motor means in one direction or the other in response to rotating member eccentricity, detector means connected between said movable tap and said impedance members to compare the instantaneous value of the impedance members with the movable tap of said impedance device, and voltage control means connected between said movable tap and said magnetic amplifiers for constantly maintaining a bias voltage on said magnetic amplifiers, said voltage control means comprising a pair of transformers provided with load output circuits, each said load output circuits being connected to a different end of said impedance device.

6. A circuit for response to the degree of eccentricity of a rotatable member relative to a neutral axis the location of which may shift in time, said circuit comprising oppositely-arranged coil means disposed at fixed locations adjacent to the periphery of said rotatable member energized to produce a shaft-position-indicating signal which varies above and below an average value according to proximity of said shaft to said coil means, respectively, such average value varying according to the location of the aforesaid neutral axis of said rotatable member relative to the coil means; adjustable means energized for producing a variable reference signal of magnitude equal that of the aforesaid average value; reversible motor means operable to effect adjustment of said adjustable means for causing change in said reference signal at a rate which is relatively slow as compared to the rate of change in said shaft-position-indicating signal produced by said coil means during rotation of said rotatable member as slow as three revolutions per minute; means for controlling operation of said reversible motor means in opposite directions according to the degree of disparity between the aforesaid average value of said shaft-position-indicating signal and said reference signal; and signal producing means responsive to a certain degree of differential between said shaft-position-indicating signal and said reference signal.

References Cited in the file of this patent

UNITED STATES PATENTS 2,657,177     Rendel _____ Oct. 27, 1953

FOREIGN PATENTS 666,898     Great Britain _____ Feb. 20, 1952